United States Patent [19]
Tanaka

[11] Patent Number: 5,412,764
[45] Date of Patent: May 2, 1995

[54] THREE-DIMENSIONAL IMAGE DISPLAY APPARATUS USING NUMERICAL PROJECTION

[75] Inventor: Yuko Tanaka, Tochigi, Japan

[73] Assignee: Kabushiki Kaisha Toshiba, Kawasaki, Japan

[21] Appl. No.: 718,977

[22] Filed: Jun. 21, 1991

[30] Foreign Application Priority Data

Jun. 22, 1990 [JP] Japan ................... 2-162957

[51] Int. Cl.$^6$ ............................. G06F 15/62
[52] U.S. Cl. ..................... 395/124; 395/127; 395/119; 364/413.16
[58] Field of Search ............. 395/127, 119, 124, 125, 395/126; 364/413.01–413.25; 359/619

[56] References Cited

U.S. PATENT DOCUMENTS

| | | | |
|---|---|---|---|
| 4,216,526 | 8/1980 | Karwowski | 364/413.14 |
| 4,472,822 | 9/1984 | Swift | 378/146 |
| 4,676,596 | 6/1987 | Kato et al. | 359/619 |
| 4,691,366 | 9/1987 | Fenster et al. | 382/54 |
| 4,879,652 | 11/1989 | Nowak | 364/413.18 |
| 4,882,679 | 11/1989 | Tuy et al. | 364/413.22 |
| 4,945,478 | 7/1990 | Merickel et al. | 364/413.22 |
| 5,124,914 | 6/1992 | Grangeat | 364/413.16 |

OTHER PUBLICATIONS

C. L. Dumoulin, et al., "Three–Dimensional Phase Contrast Angiography", Sep. 27, 1988, pp. 139–149.
Gonzalez et al, *Digital Image Processing*, Addison–Wesley Pub. Co., 1987, pp. 139–190.

*Primary Examiner*—Almis Jankus
*Attorney, Agent, or Firm*—Oblon, Spivak, McClelland, Maier & Neustadt

[57] ABSTRACT

An imaginary plane and a projection plane are set on both sides of three-dimensional image data to be parallel to each other. A plurality of projection rays are projected from the imaginary plane onto the projection plane. Sampling points for pixel values are set on each projection ray. Pixel values at the sampling points are interpolated by using the three-dimensional image data. The maximum value, integral value, standard deviation, and the like of such interpolated pixel values on the projection rays are projected on the projection plane when the sampling points are set, constant sampling periods are set, but the sampling start points are determined by using random numbers for the respective projection rays. With this operation, the phases of the sampling points on all the projection rays are set to be different from each other, thereby preventing moiré, on a projected image, which occurs when interpolated pixel values periodically vary.

20 Claims, 6 Drawing Sheets

THREE-DIMENSIONAL IMAGE DISPLAY APPARATUS USING NUMERICAL PROJECTION

BACKGROUND OF THE INVENTION

1. Field of the Invention

The present invention relates to a three-dimensional image display apparatus, and more particularly, to an apparatus for displaying three-dimensional image data by using a numerical projection method (also called a reprojection method).

2. Description of the Related Art

As methods of stereoscopically displaying three-dimensional images, a surface shading method, a wire frame display method, a cross-section transformation method, a numerical projection display method, and the like are available. The surface shading display method and the wire frame display method are suitable to express a stereoscopic surface shape of an object. The cross-section transformation display method and the numerical projection display method are suitable to express a stereoscopic internal structure of an object. A conventional apparatus using the numerical projection method as the stereoscopic display method of MRI angiography, based on the fact that the numerical projection method is suitable to express a stereoscopic internal structure, is disclosed in C. L. Dumoulin, S. P. Souza, M. F. Walker, and W. Wagle, "Three-Dimensional Phase Contrast Angiography," Magnetic Resonance in Medicine 9, 139-148 (1989). In this case, a projection image of an anglogram is displayed as three-dimensional volume data obtained by a three-dimensional MRI procedure.

A projected image is formed in the following manner. A projection plane is set at an arbitrary position with respect to three-dimensional image data. Projection rays are caused to extend from an imaginary plane parallel to the projection plane toward the projection plane so that a projected image is formed on the projection plane by using the integral values, maximum values, or standard deviations of pixels on the rays as projection values. Each projection ray is caused to sequentially extend from the imaginary plane by a predetermined unit vector, and a pixel value on the projection ray is obtained at each position where the projection ray is incident on the three-dimensional image data, i.e., at the leading end of the sequentially extended projection ray.

Assume that the length of the unit vector coincides with the pitch of the pixel arrangement of the three-dimensional image data; that the projecting direction, a pixel arrangement direction (x, y, or z) of the three-dimensional image data; and that the distance from the imaginary plane to a pixel of the three-dimensional image data, which is closest to the imaginary plane is an integer multiple of the length of the unit vector. In this case, the pixels on the projection rays can be directly obtained by using the pixels of the three-dimensional image data. Otherwise, the pixels on the projection rays must be obtained from the three-dimensional image data by interpolation.

Assume that the projecting direction crosses the arrangement direction at a small angle. In this case, upon interpolation, the interpolated pixel value arrangement on the projection rays crosses the pixel value arrangement of the three-dimensional image data. As a result, these pixel value arrangements interfere with each other and moiré (stripe artifact) may occur. The direction (longitudinal or lateral direction) of this moiré is determined depending on whether the projection plane is rotated about the x-, y-, or z-axis to be inclined. Moiré is not conspicuous much when the inclination angle of the projection angle of the projection direction is large (20° to 45°) but is conspicuous when the inclination angle is small (10° or less).

Since an image is obscured by such moiré, it is desirable that moiré be removed in any case. If moiré occurs in the above-mentioned image for medical purposes, diagnosis cannot be performed. For this reason, it is especially required to minimize moiré in such a medical image.

SUMMARY OF THE INVENTION

An object of the present invention is to provide a three-dimensional image display apparatus which can obtain a high-quality projected image without moiré when a three-dimensional image is projected on a projection plane.

According to the present invention, there is provided a three-dimensional image processing apparatus for projecting an image of a three-dimensional object on a projection plane, comprising:

means for storing three-dimensional image data representing the image of the three-dimensional object;

coordinate setting means for projecting a plurality of rays from an imaginary plane to the projection plane, the imaginary plane being located on the opposite side of the projection plane with respect to the three-dimensional object;

sampling means for setting a plurality of sampling points on the plurality of rays and sampling image data at the sampling points, at least one of periods and phases of the sampling points on at least adjacent rays being set to be different from each other; and means for projecting the image data sampled by said sampling means on the projection plane.

According to the three-dimensional image display apparatus of the present invention, the distances from corresponding sampling points for all projection rays to three-dimensional image data located closest thereto aperiodically change. This prevents moiré, on a projected image, which is a result of a periodical change of a sampled image data in the projecting direction.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

Figure 1:
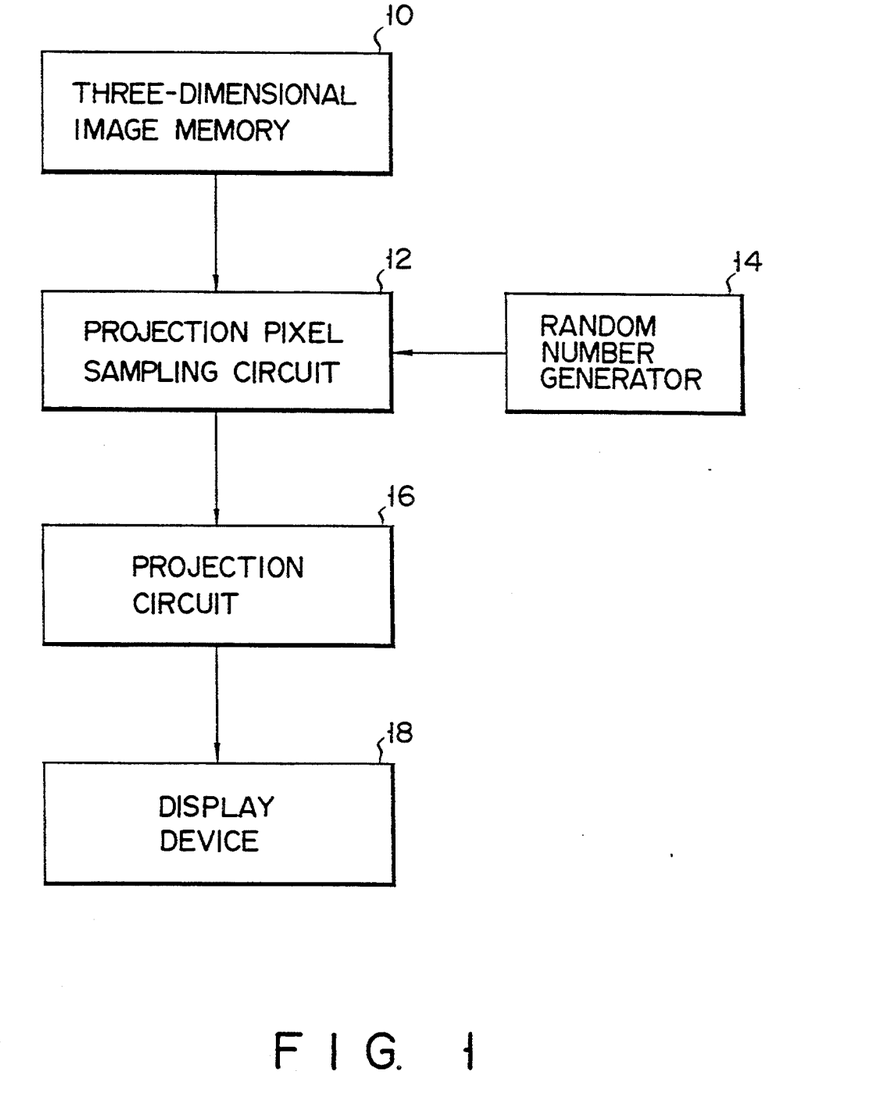
FIG. 1 is a block diagram showing an embodiment of a three-dimensional image display apparatus according to the present invention.

A preferred embodiment of a three-dimensional display apparatus according to the present invention will now be described with reference to the accompanying drawings. FIG. 1 is a block diagram showing an arrangement of the preferred embodiment. This apparatus includes a three-dimensional image memory 10 for storing three-dimensional image data supplied from three-dimensional image data acquiring units (not shown) of medical image diagnosing apparatuses such as tomographic imaging apparatuses, e.g., an X-ray CT apparatus and an MRI apparatus, and an ultrasonic diagnosing apparatus. The three-dimensional image data is constituted by discrete pixel values at lattice points which are arranged at a predetermined pitch in the x, y, and z directions. In the medical image diagnosing apparatuses, a body axis of the patient is the z direction. In this case, the pitches of the lattice points in the three directions are equal to each other when image data is acquired by an MRI apparatus. However, it is only required that the pitches be equal to each other at least in the x and y directions, and the pitch in the z direction may be different. In practice, when image data is to be acquired by an X-ray CT apparatus, an ultrasonic diagnosing apparatus, or the like, it is sometimes difficult to acquire data at the same lattice pitch in the three directions.

An output from the memory 10 is supplied to a projection pixel sampling circuit 12. A random number generator 14 is connected to the sampling circuit 12. Rays are projected from an imaginary plane onto an arbitrary projection plane. The imaginary plane is set to be parallel to the projection plane and oppose it through the three-dimensional image data. The sampling circuit 12 sets a plurality of sampling points, for each projection ray, at a predetermined period from sampling start points located at distances, from the imaginary plane, which are defined by random numbers generated by the random number generator 14, thereby acquiring image data at the sampling points. That is, the circuit 12 acquires pixel values at the leading ends of the projection rays which are caused to sequentially extend by a predetermined unit vector. If the lattice pitches of the three-dimensional image data in the three directions coincide with each other, this sampling period is set to be equal to the pitch. This is because no significant effect can be obtained in consideration of resolution even if the sampling period is further shortened. In addition, the positional relationship between the plurality of rays is determined such that their positions on the projection plane or the imaginary plane coincide with the arrangement of the lattice points of the three-dimensional image data. If the respective sampling points coincide with the lattice points of the three-dimensional image data, the three-dimensional image data is acquired as a sampled data. Otherwise, the pixel value at each sampling point is interpolated on the basis of pixel values at eight lattice points adjacent to the sampling point.

An output from the sampling circuit 12 is supplied to a projection circuit 16. The projection circuit 16 includes a projection memory corresponding to a projection plane and having storage positions for each projection ray. The circuit 16 writes predetermined pixel values in the projection memory for each projection ray to form a projected image. An output from the projection circuit 16 (projection memory) is supplied to a display device 18 to be displayed.

Figures 2, 3:
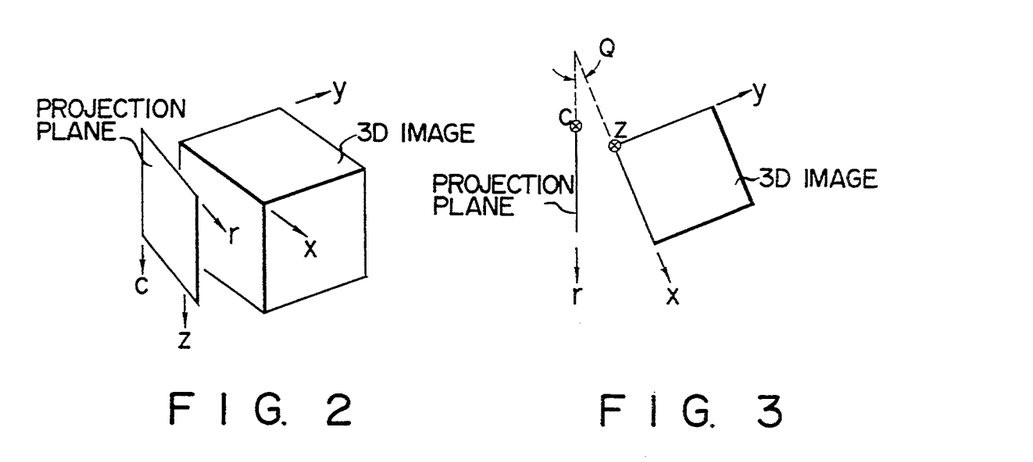
FIG. 2 is a view, showing three-dimensional image data and a projection plane rotated about the z-axis direction to be inclined with respect to the three-dimensional image data, for explaining a numerical projection method.
FIG. 3 is a view showing a relationship between the three-dimensional image data and the projection plane in FIG. 2, which is viewed from the z-axis direction.

An operation of this embodiment will be described below. Assume that a projection plane is set to be slightly inclined with respect to three-dimensional image data arranged at predetermined pitches in the x, y, and z directions in the form of a lattice, as shown in FIG. 2. If the projection plane is defined as a c-r plane, the c-axis is a rotation center axis, and the r-axis is an axis to be inclined. Assume that the projection plane is rotated about the c-axis parallel to the z-axis such that the r-axis is inclined from the x-axis direction by an angle 8, as shown in FIG. 3. That is, the projection plane is rotated about the z-axis. FIG. 3 shows the relationship between the three-dimensional image data and the projection plane, which is viewed from the z-axis direction.

Figure 4:
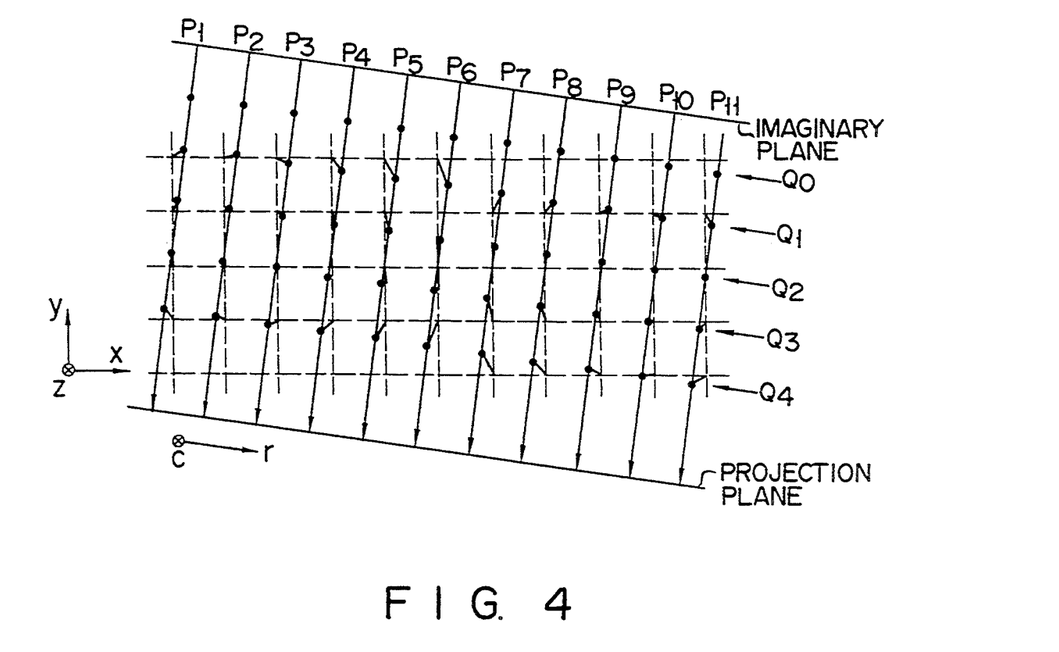
FIG. 4 is a view showing a relationship between the three-dimensional image data and sampling points of projection data in a case wherein the sampling start point of the projection data is caused to coincide with an imaginary plane in the state shown in FIG. 2.

A projected image is generally formed in the following manner. An imaginary plane (not shown in FIGS. 2 and 3) parallel to the projection plane is set first on a side, of the three-dimensional image data, which is opposite to the projection plane. Subsequently, projection rays are caused to sequentially extend from the imaginary plane toward the projection plane by a predetermined unit vector, and pixel values at the leading ends of the projection rays are sequentially obtained. In this case, the length of the unit vector is set to be equal to the pitch of the pixel value arrangement of the three-dimensional image data in consideration of resolution with this setting, sampling points Q are set for each projection ray P at a predetermined pitch from the imaginary plane. If the sampling points do not coincide with the three-dimensional image data (lattice points indicated by broken lines), the pixel values at the respective sampling points are interpolated by the three-dimensional image data. FIG. 4 shows the relationship between the three-dimensional image data within the x-y plane on the z-axis and the sampling points on the projection rays.

As described above, although projection data can be obtained from adjacent pixel values of three-dimensional image data by interpolation, an interpolated value does not coincide with a true value and is slightly deviated therefrom. This deviation is proportional to the distance from the sampling point on the corresponding projection ray to a pixel, of the three-dimensional image data, which is used for interpolation. This is because the variance of each pixel data is reduced upon interpolation but the degree of reduction of the variance corresponds to this distance. That is, with an increase in distance from a pixel on a projection ray to pixels, of three-dimensional image data, which are used for interpolation, the difference between the interpolated value and the true value is increased. In contrast to this, if a pixel on a projection ray is located near pixels, of three-dimensional image data, which are used for interpolation, the difference is small.

Figure 5:
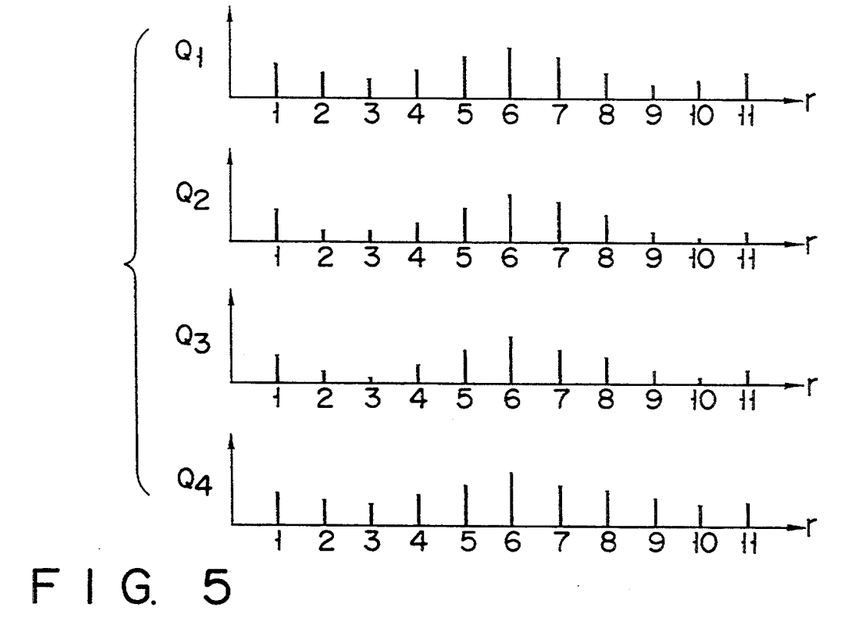
FIG. 5 is a view showing changes in distance from sampling points and pixels used to interpolate the sampling points in relation to the positions of projection rays, at each corresponding sampling point of all the projection rays in the state shown in FIG. 4.

Assume, as shown in FIG. 4, that the sampling start points of the projection data coincide with the imaginary plane, and the sampling period coincides with the pitch of the lattice points of the three-dimensional image data. In this case, the above-mentioned distance periodically varies with respect to the sampling points on each projection ray. FIG. 5 shows this distance variation at each of corresponding sampling points of all the projection rays. More specifically, FIG. 5 shows the distances from the second, third, fourth, and fifth sampling points $Q_1$, $Q_2$, $Q_3$, and $Q_4$ located in this order from the imaginary plane, to lattice points located closest to the respective sampling points, for each projection ray. As is apparent from FIG. 5, the distance from a sampling point to a lattice point, at each of the corresponding sampling points Q of all the projection rays, periodically changes with respect to a projection ray, i.e., in the r-axis direction of the projection plane. Furthermore, the peak distances appear on the same projection ray regardless of the positions of the sampling points, i.e., the phases of the distance variations are matched with each other in the r-axis direction.

Figure 6:
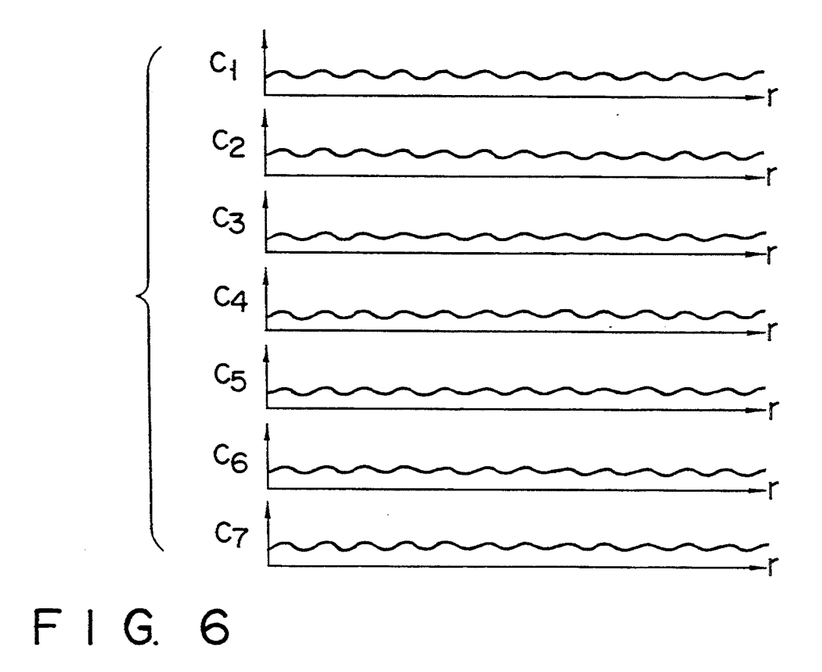
FIG. 6 is a view showing changes in distance from sampling points and pixels used to interpolate the sampling points in relation to the positions of projection rays, at each of different planes on the c-axis of the projection plane in the state shown in FIG. 4.

FIG. 6 shows changes in distance from the sampling points to the lattice points located closest thereto, at each position on the c-axis of the projection plane, for each projection ray. That is, the distance variations are identical at any positions $c_1$, $c_2$, $c_3$, $c_4$, $c_5$, $c_6$, and $c_7$ in the c-axis direction of the projection plane, and the phases of the distance variations are matched with each other in the c-axis direction.

Since the interpolated pixel values vary with such distance variations, the density of a projected image periodically varies as viewed in the r-axis direction. The phases of the density variations are matched with each other in the c-axis direction, and hence a moiré stripe occurs on the projection plane in the c-axis direction.

Figure 7:
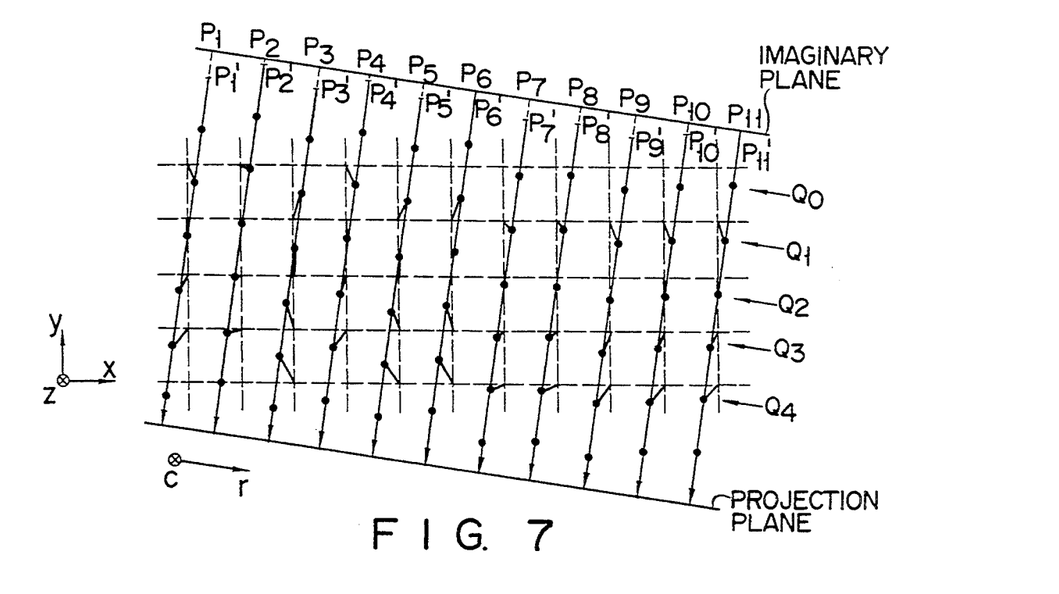
FIG. 7 is a view showing a relationship between the three-dimensional image data and projection data in a case wherein the sampling start point of the projection data is changed at random for each projection ray in the state shown in FIG. 2.

In this embodiment, in order to prevent this, sampling positions on projection rays are determined as shown in FIG. 7. The projection pixel sampling circuit 12 determines sampling points on projection rays as follows. The sampling period is set to be constant and equal to the pitch of three-dimensional image data. However, the sampling start points are not set on an imaginary plane but are set by using random numbers generated by the random number generator 14 for each projection ray, thus changing the phase of sampling points for each projection ray. More specifically, if the position vector of a conventional start point (i.e., an imaginary plane) is represented by P(r,c); an output random number of the random number generator 14, d (a real number in the range of $-0.5$ to $+0.5$); and the unit vector by which a projection ray sequentially extends (a sampling point is sequentially moved), v, a position vector P'(r,c) of a sampling start point is given by a following equation.

$$P'(r,c) = P(r,c) + d \cdot V$$

Figure 8:
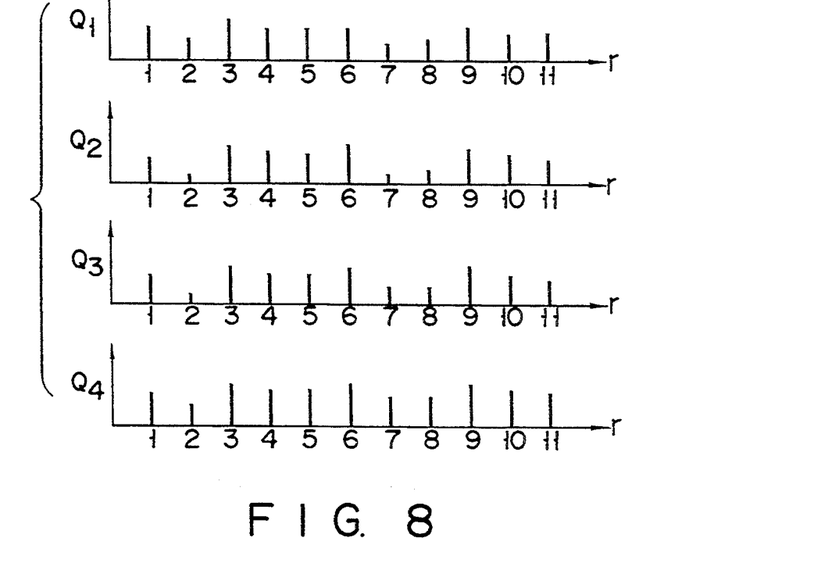
FIG. 8 is a view showing changes in distance from sampling points to pixels used to interpolate the sampling points in relation to the position of projection rays, at each corresponding sampling point of all the projection rays in the state shown in FIG. 7.
Figure 9:
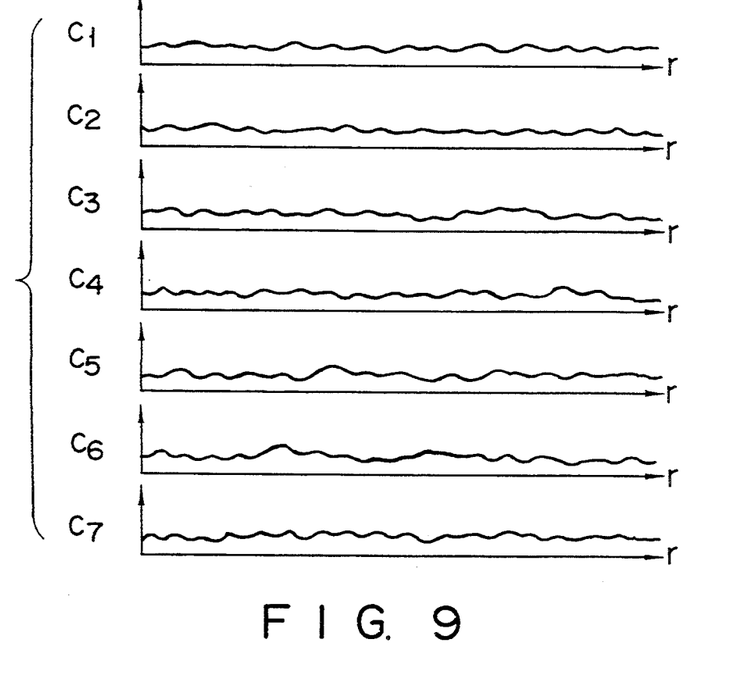
FIG. 9 is a view showing changes in distance from sampling points and pixels used to interpolate the sampling points in relation to the positions of projection rays, at each of different planes on the c-axis of the projection plane in the state shown in FIG. 7.

When the sampling start points are set at different positions for the respective projection rays in this manner, the distance from a sampling point and the nearest pixel used for interpolation varies as shown in FIG. 8. FIG. 8 shows that the distance periodically varies as in the case of FIG. 5. However, the distance 10 from the sampling points to the lattice points located closest thereto, at each position on the c-axis of the projection plane, for each projection ray changes irregularly as shown in FIG. 9, since the phase of sampling points is changed for each projection ray. The phases of the distance variations are not matched with each other in the c-axis direction. As a result, no moiré occurs in the present embodiment.

Figure 10:
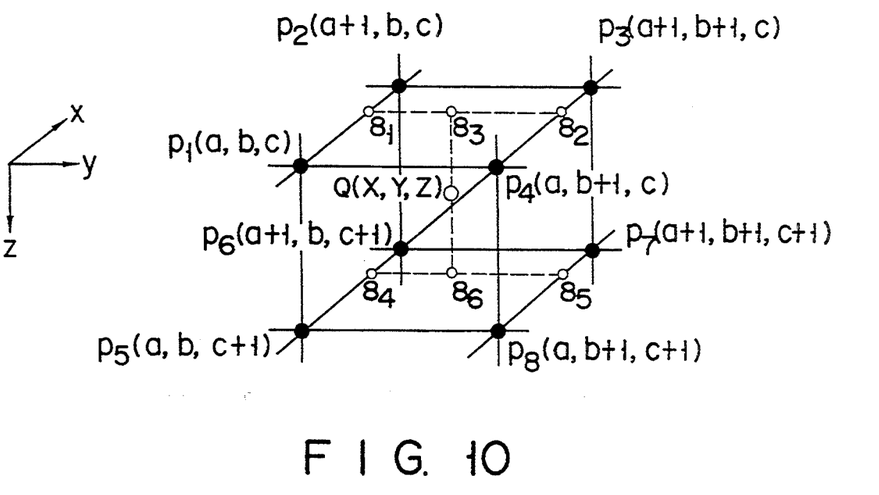
FIG. 10 is a view showing interpolation processing for projection data at sampling points.

Pixel values at the sampling points set in this manner are obtained by interpolation. Interpolation processing is not limited to a specific type of interpolation, but any type of interpolation may be performed. For example, linear interpolation of first order is shown in FIG. 10. Referring to FIG. 10, assume that black dots respectively indicate lattice points of three-dimensional image data, and a pixel value Q at a sampling point located at a position (x,y,z) is obtained. Interpolation values $q_1$, $q_2$, $q_4$, and $q_5$ are obtained first by using eight three-dimensional image data P1 to P8 adjacent to the Q.

$$q_1 = p_1 \cdot (a+1-x) + p_2 \cdot (x-a)$$

$$q_2 = p_4 \cdot (a+1-x) + p_3 \cdot (x-a)$$

$$q_4 = p_5 \cdot (a+1-x) + p_6 \cdot (x-a)$$

$$q_5 = p_8 \cdot (a+1-x) + p_7 \cdot (x-a)$$

Subsequently, interpolation values $q_3$ and $q_6$ are obtained by using the interpolation values $q_1$, $q_2$, $q_4$, and $q_5$ and the interpolation value Q is obtained from the interpolation values $q_3$ and $q_6$.

$$q_3 = p_1 \cdot (b+1-y) + q_2 \cdot (y-b)$$

$$q_6 = p_3 \cdot (b+1-y) + p_4 \cdot (y-b)$$

$$Q = q_3 \cdot (c+1-z) + q_6 \cdot (z-c)$$

The projection circuit 16 has the memory corresponding to the projection plane. The projection circuit 16 writes projection values for each projection ray, e.g., the maximum value of image data, the average value of peak values, an arithmetic operation value such as an integral value, and a statistic operation value such as a standard deviation at corresponding positions in the projection memory, thus forming a projected image.

As has been described above, according to the present embodiment, when three-dimensional data arranged in a three-dimensional space in the form of a lattice is to be projected on an arbitrary projection plane, even if the projection direction crosses the arrangement direction of the image data at a small angle, since the phase of pixel values sampled on projection rays is changed for each projection ray, variations in distance from sampling points to lattice points are not periodic. Therefore, no moiré occurs on a projected image.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

Figure 11:
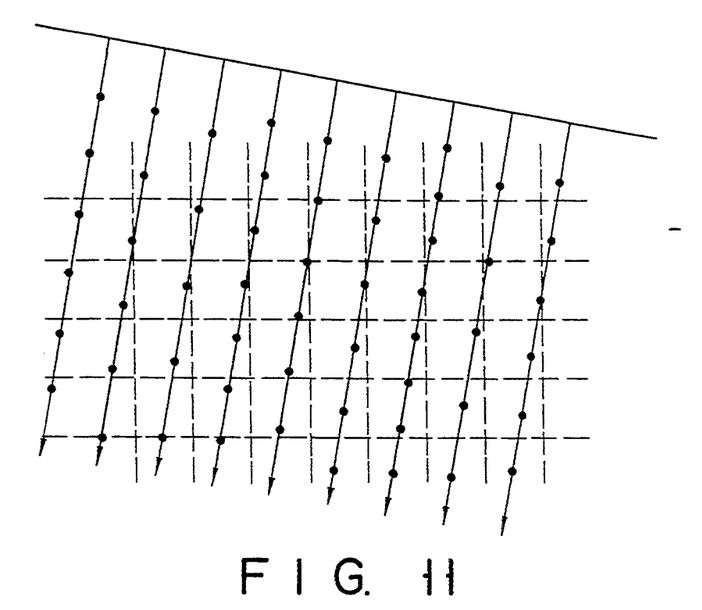
FIG. 11 is a view showing a first modification of this embodiment.

For example, in the embodiment, the start point of each projection ray extended by the unit vector is changed at random. However, as shown in FIG. 11, while the start point of each projection ray may be set to coincide with an imaginary plane so as to be invariable, the length of a unit vector by which each projection ray extends may be changed at random, i.e., a pixel sampling period may be changed for each projection ray. If the period changes, phases of the sampling points are not matched with each other. Therefore, no moiré occurs. Note that when a sampling period and a sampling phase are changed for each projection ray, it is only required that they are changed at least between adjacent projection rays.

Figure 12:
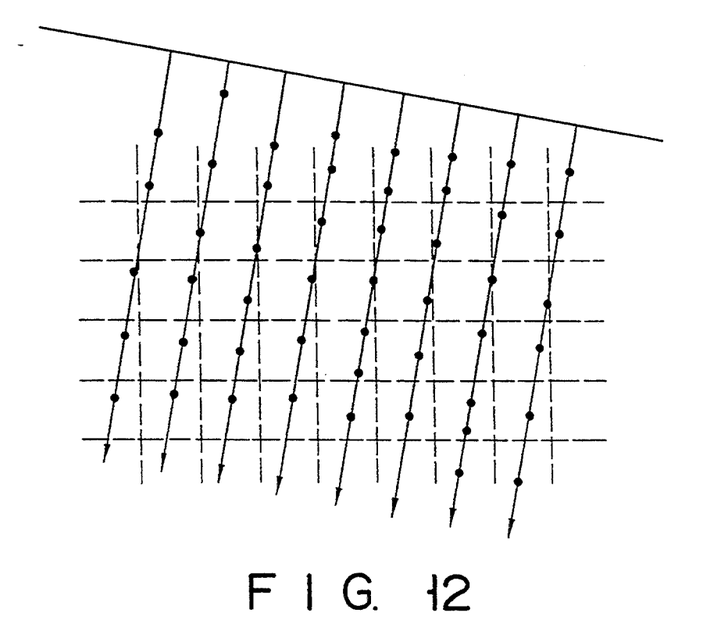
FIG. 12 is a view showing a second modification of this embodiment.

In addition, as shown in FIG. 12, each projection ray may not be caused to extend by a predetermined unit length but the unit length may be determined in accordance with a random number in each extending operation. That is, in this case, sampling periods for the respective projection rays are not constant.

Further, although not shown, the arrangement (the pitches in the r- and c-axis directions) of projection rays may not be constant and may be set to be variable within a range defined by random numbers in accordance with the pitch of the lattice points of three-dimensional image data. Furthermore, moiré is caused when sampling points are periodically set. Therefore, in order to prevent moiré, it is only required that sampling points be a periodically set, but sampling points need not be set in accordance with random numbers. For example, moiré can be prevented if the entire space of three-dimensional image data is not uniformly sampled, but only a region of interest is sampled at a predetermined short period while other regions are sampled at a predetermined long period. In addition, the present invention is not limited to the above-described types of arithmetic operations of pixel value to be projected, but other types of operation values may be projected. Moreover, the relationship between a projection plane and a three-dimensional image is not limited to the case shown in FIGS. 2 and 3. In any case, the effect of the present invention can be obtained.

As has been described above, according to the present invention, when three-dimensional data arranged in a three-dimensional space in the form of a lattice is to be projected on an arbitrary projection plane, even if the projection direction crosses the arrangement direction of the image data, since the phase or the sampling period of pixel values sampled on projection rays is changed for each projection ray, variations in distance from sampling points to lattice points are not periodic. Therefore, no moiré occurs on a projected image.

What is claimed is:

1. A three-dimensional image processing apparatus for generating a two-dimensional image on a projection plane from a three-dimensional object, comprising:
   means for storing three-dimensional image data representing the three-dimensional object;
   coordinate setting means for projecting a plurality of rays from an imaginary plane to the projection plane, the imaginary plane being opposite the projection plane the three-dimensional image data being graphically located between the imaginary plane and the projection plane;
   sampling means for setting a plurality of sampling points of the three-dimensional image along the plurality of rays extending from the imaginary plane to the projection plane and passing through the three-dimensional image data and for sampling image data of the three-dimensional image at the sampling points, at least one of periods and phases of the sampling points on at least adjacent rays being set to be different from each other; and
   means for projecting the image data sampled by said sampling means on the projection plane.

2. An apparatus according to claim 1, wherein said three-dimensional image data are graphically arranged at predetermined pitches in orthogonal x, y, and z directions in a form of lattice and said sampling means comprises means for interpolating image data at unsampled points by using image data of adjacent said sampling points.

3. An apparatus according to claim 1, wherein said projecting means comprises a memory corresponding to the projection plane, and means for writing an arithmetic operation value of the image data sampled for each ray at a corresponding position in said memory.

4. An apparatus according to claim 3, wherein said projecting means comprises a memory corresponding to the projecting plane, and means for writing one of a maximum value and an average value of peak values of the image data sampled for each ray at a corresponding position in said memory.

5. An apparatus according to claim 3, wherein said projecting means comprises a memory corresponding to the projection plane, and means for writing an integral value of the image data sampled for each ray at a corresponding position in said memory.

6. An apparatus according to claim 1, wherein said projecting means comprises a memory corresponding to the projection plane, and means for writing a statistic operation value of the image data sampled for each ray at a corresponding position in said memory.

7. An apparatus according to claim 6, wherein said projecting means comprises a memory corresponding to the projection plane, and means for writing a standard deviation of the image data sampled for each ray at a corresponding position in said memory.

8. An apparatus for generating a two-dimensional image on a projection plane from a three-dimensional object set at an arbitrary position, the three-dimensional object being represented by a three-dimensional image created from three-dimensional image data at lattice points arranged at a predetermined pitch in a three-dimensional space, comprising:

means for projecting a plurality of parallel rays on the projection plane through the three-dimensional space;

sampling means for setting a plurality of sampling points of the three-dimensional image along the plurality of rays extending from an imaginary plane to the projection plane and passing through the three-dimensional image data and for sampling image data of the three-dimensional image at the sampling points, and for obtaining image data at the sampling points, the sampling points being set such that a distance from each sampling point on each ray to a lattice point located closest thereto irregularly varies; and projecting image forming means for projection the image data obtained by said sampling means on the projection plane.

9. An apparatus according to claim 8, wherein said sampling means comprises means for setting sampling points at predetermined periods from different initial positions for the respective rays.

10. An apparatus according to claim 9, wherein said projecting means comprises means for projecting rays from an imaginary plane to the projection plane, the imaginary plane being parallel to the projection plane and being located on the opposite side of the projection plane with respect to the three-dimensional image, and said sampling means comprises means for setting sampling points, for each of the rays, at predetermined periods from initial positions located at different distances from the imaginary plane.

11. An apparatus according to claim 8, wherein said sampling means comprises means for setting sampling points at different periods for the respective rays.

12. An apparatus according to claim 11, wherein said projecting means comprises means for projecting rays from an imaginary plane to the projection plane, the imaginary plane being parallel to the projection plane and being located on the opposite side of the projection plane with respect to the three-dimensional image, and said sampling means comprises means for setting sampling points at different periods from the imaginary plane for the respective rays.

13. An apparatus according to claim 8, wherein said sampling means comprises means for setting sampling points at different periods from different initial positions for the respective rays.

14. An apparatus according to claim 8, wherein said sampling means comprises a random number generator, and means for determining a distance from each sampling point to a subsequent sampling point for each of the rays in accordance with an output from said random number generator.

15. A method of projecting three-dimensional image data on a projection plane by generating a two-dimensional image on the projection plane from a three-dimensional object, comprising the steps of:

projecting a plurality of parallel projection rays on the three-dimensional image data;

determining a plurality of sampling points of the three-dimensional image along the respective projection rays extending from an imaginary plane to the projection plane and passing through the three-dimensional image data, such that at least one of phases and periods of sampling points on adjacent projection rays are different from each other;

acquiring image data at a sampling point if the image data is present at the sampling point, and performing interpolation by using image data near the sampling point if no image data is present at the sampling point; and projecting the image data at the sampling points for the respective projection rays on the projection plane which crosses the projection rays.

16. A method according to claim 15, wherein said step of determining the sampling points includes the step of starting sampling at a predetermined period from points separated from an imaginary plane by distances determined by random numbers for the respective projection rays, the imaginary plane being parallel to the projection plane and being located on the opposite side of the projection plane with respect to the three-dimensional image data.

17. A method according to claim 15, wherein said step of determining the sampling points includes the step of starting sampling from an imaginary plane at periods determined by random numbers for the respective projection rays, the imaginary plane being parallel to the projection plane and being located on the opposite side of the projection plane with respect to the three-dimensional image data.

18. A method according to claim 15, wherein said projecting step includes the step of projecting arithmetic operation values of the image data at the sampling points for the respective projection rays on the projection plane.

19. A method according to claim 15, wherein said projecting step includes the step of projecting stab tistic operation values of the image data at the sampling points for the respective projection rays on the projection plane.

20. A display apparatus for displaying a three-dimensional image on a two-dimensional surface and providing perspective views, comprising:

three-dimensional image memory means for storing image data representing a three-dimensional object;

coordinate setting means for setting the coordinates of an imaginary plane with respect to the three-dimensional image stored in the memory means, the imaginary plane being a viewpoint of an operator viewing the three-dimensional object in real space, and for projecting a plurality of imaginary rays from the imaginary plane to a projection plane positioned on an opposite side of the three-dimensional image stored in the memory means;

sampling means for determining sampling points along each said ray, which extend from the imaginary plane, through the three-dimensional image and to the projection plane, for sampling the three-dimensional image stored in the memory means, each of said sampling points are determined such that a sampling period along each said ray is equal to a pitch of the three-dimensional image stored in the memory means;

a random number generating means for generating random numbers, which are used to randomly determine starting points for each said ray of said sampling points, such that the length of each said ray is the same, but the phase of adjacent said rays of sampling points are different from each other; and means for projecting the three-dimensional image, determined from the view-point of the imaginary plane, as a two dimensional image onto a display device.

* * * * *